United States Patent Office 2,777,773
Patented Jan. 15, 1957

2,777,773

BARIUM TITANATE OF INCREASED DIELECTRIC CONSTANT AND PIEZOELECTRIC RESPONSE AND METHOD OF PRODUCING SAME

Robert M. Callahan, Alexandria, Va., assignor to the United States of America as represented by the Secretary of the Navy No Drawing. Application July 1, 1953, Serial No. 365,564

4 Claims. (Cl. 106—39)

(Granted under Title 35, U. S. Code (1952), sec. 266)

This invention relates to a method for the production of barium titanate of enhanced electrical properties and to the new product.

Barium titanate, $BaTiO_3$, is a polycrystalline substance which has attracted considerable attention in recent years as a ceramic piezolectric transducer material.

Customarily, barium titanate is produced in a pure form by the calcination of a powdered mixture of approximately equimolar quantities of barium carbonate and titanium dioxide, the barium carbonate being present in slight molar excess, for example, about .01 mol percent. The calcination is carried out at a temperature of about 1150° C. and requires from about 4 to 10 hours for completion depending on the titanium dioxide used, rutile requiring a considerably longer time than anatase. This method has the disadvantage that the long heating period induces undesirable growth in the grain size of the barium titanate with consequent lowering of its physical and electrical properties. In this respect, the longer, generally, the heating time for the calcination, the greater is the size of the crystal of the barium titanate produced and the lower is its physical and electrical properties. An ideal method for the production of barium titanate of high physical and electrical properties envisages calcination of the starting materials in the shortest possible time in order to minimize grain growth of the product.

I have found that a pure barium titanate can be produced from barium carbonate and titanium dioxide in a much shorter time than heretofore and with higher physical properties, dielectric constant and piezoelectric response when the calcination is conducted in the presence of from about .01 to .04% by weight of added antimony trioxide, $Sb_2O_3$. Preferably, the antimony trioxide is added in an amount which is about .02% by weight. The antimony trioxide may be added as such or in the form of an antimony salt which decomposes on heating in the calcination to form the trioxide, for example, antimony trichloride. Antimony trioxide which may occur in the titanium dioxide as an impurity is not effective to shorten the calcination time required for completion of the reaction between the barium carbonate and titanium dioxide. This desirable result is brought about by carrying out the calcination in the presence of the added antimony trioxide by which is meant herein not only the compound as such but also the same as it is derived in situ by heating of an aforesaid decomposable salt of antimony in the calcination.

The method of my invention is carried out in accordance with the known prior art procedure for the production of barium titanate with the exception of the presence of the added antimony trioxide and the use of only a 2 to 4 hour calcination time as against a 4 to 10 hour time for the prior art method. The time required in each case for complete calcination of the reaction mixture will depend upon the species of titanium dioxide used, anatase requiring about 2 hours and rutile about twice that time, or about 4 hours. The calcination temperature is about 1150° C., as in the prior art method, and may range from about 1125 to 1175° C.

The following specific examples of the preparation of barium titanate illustrate the method of my invention in greater detail. Parts are by weight.

*Example 1*

1700 parts barium carbonate, 685 parts titanium dioxide (anatase) and 0.4 part antimony trioxide were water ground together in a ball mill, dried and then pulverized in the ball mill to pass a 325 mesh screen. The powder mixture was packed into a kyanite crucible and calcined at 1150° C. in an electric oven for two hours, at which time the calcination was complete. The product is a white powder of high physical and electrical properties.

A companion run was made with a powder mixture made in the same way with the corresponding amounts of the barium carbonate and titanium dioxide (anatase) but without the addition of antimony trioxide. The calcination was incomplete at the end of two hours and the product had poor physical and electrical properties.

*Example 2*

A powder mixture having the same proportions of barium carbonate and titanium dioxide as in Example 1 and prepared as described therein but containing the rutile species in place of the anatase species of titanium dioxide was calcined at 1150° C. in an electric oven for four hours, at which time the calcination had been completed. The product barium titanate is a white powder of high physical and electrical properties.

A companion run was made in this case also using the corresponding amounts of the barium carbonate and titanium dioxide (rutile) but without the addition of antimony trioxide. The calcination was incomplete at the end of four hours and the product had poor physical and electrical properties.

The barium titanate produced by the method of the invention contains antimony trioxide in an amount up to but less than 0.1% by weight. This antimony trioxide is present therein either as such or in combination with barium and titanium as barium titanium antimonate and in the product claim appended hereto, antimony trioxide is intended to embrace either or both of these conditions of its existence in the barium titanate. The barium titanate may be made into articles or sheets in known way by dry pressing, extrusion or slip casting and subsequent firing of the shape at elevated temperatures, e. g. at 1375 to 1430° C. The sheet or article of the barium titanate can be made piezoelectric responsive by subjecting it in an electrical field to a polarizing potential.

The dielectric constant, the value $$\frac{\Delta f}{f}$$

which is commonly accepted as a close and ready measure of the coupling coefficient of a material and the fired density of the barium titanate as made in the above examples by the method of the present invention and the corresponding values for barium titanate made by the above mentioned prior art method are given in the table below. The value $$\frac{\Delta f}{f}$$

was determined using a disc of the barium titanate. The barium titanate is identified in the table as to species of the titanium dioxide from which made by the notations, anatase and rutile, and as to the method of making by the notation, $Sb_2O_3$ added, for the method of the invention and by the notation, Sb₂O₃ not added, for the method of the prior art.

|  | Dielectric Constant | $\frac{\Delta f}{f}$ (disc) | Fired Density, gm./cc. |
| --- | --- | --- | --- |
| Sb₂O₃ Added: | | | |
| anatase | 2,000 | .074 | 5.77 |
| rutile | 2,200 | .077 | 5.78 |
| Sb₂O₃ Not Added: | | | |
| anatase | 1,700 | .060 | 5.70 |
| rutile | 1,900 | .072 | 5.72 |

From the above table it is readily seen that the values for the dielectric constant, $$\frac{\Delta f}{f}$$

disc and fired density of the barium titanate of the method of the invention are higher than in the case of the prior art barium titanate.

The value $\frac{\Delta f}{f}=$ the antiresonant frequency of a crystal minus the resonant frequency over the resonant frequency It is an absolute value which can be employed in one of several known equations to obtain the approximate coupling coefficient for a crystalline material. One of these known equations is $$k_d{}^2 = 2.52 \frac{\Delta f}{f}$$

where $d$ indicates the disc shape of the crystalline material. The coupling coefficient is the universal measure of piezoelectric response of a crystalline material. The higher $$\frac{\Delta f}{f}$$

value, the higher the percentage efficiency of piezoelectric response in the crystal, which in turn means greater fidelity.

While in the foregoing description of the invention I have made reference to certain specific embodiments thereof, it is to be understood that the same are intended primarily by way of illustration and not in limitation and that the scope of the invention is defined by the appended claims.

The invention described herein may be manufactured and used by or for the Government of the United States of America for governmental purposes without the payment of any royalties thereon or therefor.

What I claim is:

1. A method of producing barium titanate which comprises calcining a powder mixture of barium carbonate and titanium dioxide containing the former in slight molar excess over the latter and between about .01 and .04% by weight of added antimony trioxide at a temperature between about 1125 and 1175° C. for a period of time between about 2 and 4 hours.

2. A method of producing barium titanate which comprises calcining a powder mixture of barium carbonate and titanium dioxide containing the former in slight molar excess over the latter and about .02% by weight of added antimony trioxide at a temperature between about 1125 and 1175° C. for a period of time between about 2 and 4 hours.

3. A method of producing barium titanate which comprises calcining a powder mixture of barium carbonate and titanium dioxide containing the former in a .01 mol percent excess over the latter and about .02% by weight of added antimony trioxide at a temperature of about 1150° C. for a period of time between about 2 and 4 hours.

4. Barium titanate having an antimony trioxide content from about .01 to less than 0.1% by weight, a dielectric constant between about 2000 and 2200, a $$\frac{\Delta f}{f}$$

(disc) value between about .074 and .077 and a fired density between about 5.77 and 5.78 grams per cc.

References Cited in the file of this patent

UNITED STATES PATENTS 2,529,719    Wentworth _____ Nov. 14, 1950